United States Patent [19]

Watanabe

[11] Patent Number: 4,624,349

[45] Date of Patent: Nov. 25, 1986

[54] METHOD AND APPARATUS FOR CONTROLLING AN ELECTROMAGNETIC CLUTCH FOR USE ON A VEHICLE

[75] Inventor: Tomoyuki Watanabe, Susono, Japan

[73] Assignee: Toyota Jidosha Kabushiki Kaisha, Toyota, Japan

[21] Appl. No.: 654,021

[22] Filed: Sep. 25, 1984

[51] Int. Cl.[4] .................. F16D 37/02; B60K 41/02
[52] U.S. Cl. .......................... 192/0.076; 192/0.096; 192/21.5
[58] Field of Search ............... 192/0.032, 0.033, 0.034, 192/0.07, 0.075, 0.076, 0.096, 103 R, 21.5

[56] References Cited

U.S. PATENT DOCUMENTS

| | | | |
|---|---|---|---|
| 3,335,829 | 8/1967 | deCoye deCastelet | 192/0.033 |
| 3,402,793 | 9/1968 | Schell | 192/103 R X |
| 4,397,379 | 8/1983 | Baudoin | 192/0.032 |
| 4,403,683 | 9/1983 | Takano | 192/0.075 X |
| 4,466,521 | 8/1984 | Hattori et al. | 192/0.076 X |

Primary Examiner—Rodney H. Bonck
Assistant Examiner—Richard M. Lorence
Attorney, Agent, or Firm—Oblin, Fisher, Spivak, McClelland & Maier

[57] ABSTRACT

Method and apparatus for controlling an electromagnetic clutch of a vehicle to transmit a torque of the engine to the drive wheels through an engaging action thereof which is effected by a solenoid, a clutch torque to be transmitted by the clutch being varied as a function of an electric current to energize the solenoid so as to be increased with an actual speed of the engine during the engaging action of the clutch. The method or apparatus comprises: a step or device for detecting a currently required output of the engine during a period of the engaging action of the clutch; and a step or device for changing a rate of increase in the electric current relative to the actual speed of the engine, so that the rate of increase is increased as the required output of the engine is decreased. The clutch may be of magnetic powder type. The controlling method or apparatus may comprise a step or device for controlling the electric current even after completion of the clutch engagement, based on the actual output torque of the engine, such that the clutch torque is larger than the actual output torque of the engine and smaller than an allowable upper limit torque of the engine.

10 Claims, 9 Drawing Figures

METHOD AND APPARATUS FOR CONTROLLING AN ELECTROMAGNETIC CLUTCH FOR USE ON A VEHICLE

BACKGROUND OF THE INVENTION

The present invention relates generally to a method and an apparatus for controlling an electromagnetic clutch for use on a vehicle. More particularly, the invention is concerned with improved technologies for effecting a smooth engaging action of such an electromagnetic clutch upon starting of the vehicle, while assuring a satisfactorily high fuel economy of the vehicle.

In the art of a power transmission system of a vehicle, an electromagnetic clutch is used as means for easy control of a torque to be transmitted. An example of such an electromagnetic clutch comprises: a driving rotary member operatively connected to an engine of a vehicle; a driven rotary member operatively connected to drive wheels of the vehicle and cooperating with the driving rotary member to define an annular space therebetween; a mass of magnetic powder accommodated in the annular space between the driving and driven rotary members; and a solenoid which is energized to generate a magnetic force for causing particles of the magnetic powder to be tightly bonded together in the annular space so that the mass of magnetic powder connects the driving and driven rotary members to transmit a torque from the driving rotary member to the driven rotary member. In this electromagnetic clutch, a value of the torque which is delivered from the driving rotary member (from the engine) to the driven rotary member (drive wheels) is varied as a function of an electric current to be applied to the solenoid. This characteristic of the electromagnetic clutch is utilized to obtain an optimum or smooth control of an engaging action of the clutch, for example at the time of starting the vehicle, by increasing a magnitude of solenoid energizing electric current at a predetermined rate relative to the engine speed. After the engine speed has been raised to a predetermined level, the solenoid energizing current is made constant.

However, it has been a common practice that such a solenoid energizing current is increased at a fixed rate in proportion to the actual speed of the engine. Further, the rate of increase in the energizing current relative to the engine speed is generally set at a relatively low level, so that the clutch engagement is effected slowly to provide sufficiently high drivability of the vehicle even when the vehicle is started or accelerated abruptly or started on an upward slope. This low setting of the increase rate of the solenoid energizing current (i.e., of the torque transmitted by the clutch) relative to the engine speed, does not necessarily assure satisfactory fuel economy (low specific fuel consumption) while the engine is operating for starting the vehicle.

SUMMARY OF THE INVENTION

It is accordingly an object of the present invention to provide a method and an apparatus for controlling an electromagnetic clutch for a vehicle, which provide an improvement in fuel economy of the vehicle while maintaining satisfactorily high drivability of the vehicle.

According to the invention, there is provided a method of controlling an electromagnetic clutch which is incorporated in a power transmission system of a vehicle to transmit an output of an engine to drive wheels, and which includes a solenoid to be energized for an engaging action of the electromagnetic clutch to transmit a torque of the engine to the drive wheels, a clutch torque to be transmitted by the clutch being varied as a function of an electric current to energize the solenoid so that the clutch torque is increased with an actual speed of the engine, during the engaging action of the clutch, the method comprising the steps of: (1) detecting a currently required output of the engine during a period of the engaging action of the electromagnetic clutch; and (2) changing a rate of increase in the solenoid energizing electric current relative to the actual speed of the engine, such that said rate of increase is increased as the required output of the engine is decreased.

According to the invention, there is also provided an apparatus suitable for practicing the method of the invention described above. The apparatus comprises: (1) engine output detecting means for detecting a currently required output of the engine during a period of the engaging action of the clutch; (2) increase-rate changing means for changing a rate of increase in the solenoid energizing electric current relative to the actual speed of the engine, such that said rate of increase is increased as the required output of the engine is decreased; and (3) current adjusting means for increasing a magnitude of the electric current according to said rate of increase, as the actual speed of the engine is increased.

In the method and apparatus of the invention constructed as described above, a currently required output of the engine is detected during a period of an engaging action of the electromagnetic clutch, while a rate of increase in clutch solenoid energizing electric current relative to an actual speed of the engine is determined so that the rate of increase is increased as the currently required output of the engine is decreased. A magnitude of the solenoid energizing current is increased according to the determined rate of increase thereof, as the actual speed of the engine is increased. In this arrangement, the solenoid energizing electric current is increased with the actual speed of the engine at a comparatively low rate when the currently required output of the engine is relatively high with a relatively large amount of depression of an accelerator pedal of the vehicle, for example while the vehicle is being started. In other words, the electromagnetic clutch is operated relatively slowly for a smooth engaging action and therefore the vehicle is run with a desirable drivability (with sufficient engine power) even when the vehicle is abruptly accelerated or started on an upward slope. On the contrary, when the currently required output of the engine is relatively low with the accelerator pedal operated in a small amount, the solenoid energizing electric current is increased with the engine speed at a comparatively higher rate, and consequently the clutch engagement proceeds relatively fast so as to minimize reduction in fuel economy due to otherwise possible slip of the driving and driven members of the electromagnetic clutch. While the required engine output is low, the rate of increase in the engine speed is low, that is, the vehicle is accelerated at a low rate. In this condition, therefore, a relatively fast engaging action of the electromagnetic clutch will not impair the drivability of the vehicle.

The method and apparatus of the invention is suitably used for controlling an electromagnetic clutch of magnetic powder type which includes a driving and a driven rotary member operatively connected to the engine and the drive wheels, respectively. The driving and driven rotary members cooperate to define an annular space therebetween, in which a mass of magnetic powder is accommodated. Upon energization of the solenoid, particles of the magnetic powder are tightly bonded together so that the mass of magnetic powder connects the driving and driven rotary members and thereby transmits the torque from the driving rotary member to the driven rotary member at a rate of transmission corresponding to a variation in the magnitude of electric current applied to the solenoid.

According to an advantageous embodiment of the apparatus of the invention, the engine output detecting means comprises a sensor for detecting an angle of opening of a throttle valve which is disposed in an intake manifold connected to the engine.

According to another embodiment of the invention, the increase-rate determining means continuously calculates the clutch torque based on the determined required output of the engine and on the actual speed of the engine, and according to a predetermined relation among the clutch torque, and the required output and actual speed of the engine, and the current adjusting means supplies the electric current to the solenoid while the calculated clutch torque is smaller than the engine torque, in order to obtain the calculated clutch torque.

According to a further advantageous embodiment of the invention, the current adjusting means comprises a current sensor for detecting a magnitude of electric current actually flowing through the solenoid, and a current feedback regulator for varying an energization voltage of the solenoid such that the magnitude of electric current to be applied to the solenoid coincides with the detected magnitude of electric current actually flowing through the solenoid, irrespective of a variation in impedance of the solenoid.

According to another aspect of the invention, there is provided an apparatus for controlling an electromagnetic clutch of magnetic powder type which is incorporated in a power transmission system of a vehicle which includes an engine, and a continuously variable transmission of belt-and-pulley type operatively connected to drive wheels of the vehicle and comprising a pair of variable-diameter pulleys each having a variable-width of Vee groove, and a transmission belt engaging the Vee grooves of the variable-diameter pulleys, the variable transmission transmitting an output of the engine to the drive wheels without a slip of the belt on the pulleys within an allowable torque range, the electromagnetic clutch being interposed between the engine and the transmission and including a solenoid to be energized for an engaging action of the clutch to transmit a torque of the engine to the transmission according to a variation in magnitude of an electric current to energize the solenoid, the apparatus controlling the magnitude of electric current, even after the completion of the engaging action of the clutch, so as to control a clutch torque to be transmitted by the clutch to the variable transmission, wherein the improvement comprises: (1) engine speed detecting means for detecting a currently required output of the engine; (2) engine torque determining means for determining an actual output of the engine; and (3) current adjusting means for controlling the solenoid energizing electric current based on the determined actual output torque of the engine, such that the clutch torque transmitted by the clutch to the transmission is larger than the actual output torque of the engine and smaller than an allowable upper limit torque of the transmission.

BRIEF DESCRIPTION OF THE DRAWING

The above and other objects, features and advantages of the present invention will become more apparent from reading the following description of the preferred embodiment taken in conjunction with the accompanying drawing in which.

DETAILED DESCRIPTION OF THE PREFERRED EMBODIMENT

The present invention will be described in detail referring to the accompanying drawing illustrating one preferred embodiment of the invention.

Figure 1:
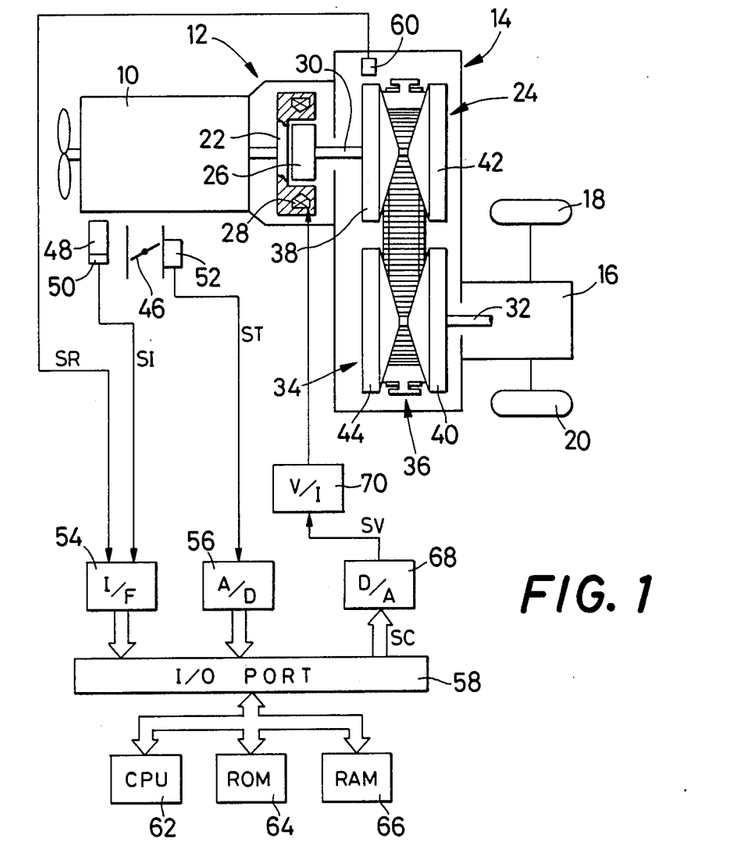
FIG. 1 is a schematic illustration of a power transmission system which incorporates an electromagnetic clutch of magnetic powder type, a continuously variable transmission of belt-and-pulley type, and one embodiment of an apparatus of the invention for controlling the electromagnetic clutch.
Figure 2:
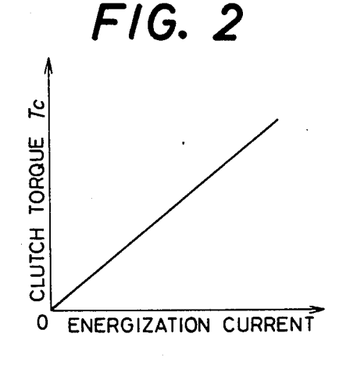
FIG. 2 is a graphical representation of generally known relation between a torque transmitted by the electromagnetic clutch of FIG. 1, and an electric current to energize a solenoid for engaging action of the clutch.

There is shown in FIG. 1 an engine 10 of an automotive vehicle, an output torque of which is transmitted to drive wheels 18, 20 via an electromagnetic clutch 12 of magnetic powder type, a continously variable transmission 14 of belt-and-pulley type and a differential assembly 16. The electromagnetic clutch 12 comprises a driving rotary member 22 operatively connected to the engine 10, and a driven rotary member 26 connected to a variable-diameter pulley 24 on the input side of the variable transmission 14. The driving rotary member 22 is disposed radially outwardly of the driven rotary member 26, so that the inner circumferential surface of the driving rotary member 22 cooperates with the outer circumferential surface of the driven rotary member 26 to define an annular space. The clutch 12 uses a mass of magnetic powder (not shown) accommodated in the annular space between the driving and driven rotary members 22, 26, and a solenoid 28 which is disposed integrally within the driving rotary member 22 and energized to produce a magnetic force which causes particles of the magnetic powder to be tightly bonded together so that the powder mass contacts the inner and outer surfaces of the driving and driven rotary members 22, 26, thereby connecting the two members 22, 26 to transmit a torque from the driving rotary member 22 to the driven rotary member 26. The electromagnetic clutch 12 has the characteristics that the torque transmitted by means of the powder mass is varied as a function of an electric current which is applied to the solenoid 28. Stated more specifically, the torque transferred from the driving rotary member 22 to the driven rotary member 26 (hereinafter referred to as "clutch torque") is increased as the electric current to energize the solenoid 28 is increased, as illustrated in FIG. 2.

The belt-and-pulley type variable transmission 14 comprises the above indicated first variable-diameter pulley 24 having a variable effective diameter and coupled to the driven rotary member 26 via an input shaft 30. The variable transmission 14 further comprises a second variable-diameter pulley 34 having a variable effective diameter and coupled to the differential assembly 16 via an output shaft 32, and a transmission belt 36 connecting the first and second variable-diameter pulleys 24, 34. The first pulley 24 includes an axially stationary rotor 38 fixed to the input shaft 30, while the second pulley 34 includes an axially stationary rotor 40 fixed to the output shaft 32. The first and second pulleys 24 and 34 further include an axially movable rotor 42, and an axially movable rotor 44, respectively. These movable rotors 42, 44 are mounted on the input and output shafts 30, 32 axially slidably relative to the stationary rotors 38, 40, respectively, and rotatable together with the input and output shafts 30, 32. The axially movable rotors 42 and 44 are moved by respective hydraulic actuators (not shown) which are operated under control of a hydraulic control system (not shown) associated with the transmission 14. The stationary and movable rotors 38, 42 of the first pulley 24, and the stationary and movable rotors 40, 44, cooperate to define Vee grooves engaging the transmission belt 36. With the movable rotors 42 and 44 moved toward and away from the corresponding stationary rotors 38, 40, widths of the respective Vee grooves are changed, whereby the effective diameters of the pulleys 24, 34 engaging the belt 36 are varied to change a speed ratio of the two pulleys 24, 34. The hydraulic control system includes a pressure generating device which provides a line pressure. This line pressure is controlled so that it is increased as the actual speed of the engine 10 is increased, and as the opening angle of a throttle valve 46 (described later) is increased. Further, the line pressure is controlled so that a rotary motion of the input shaft 30 within an allowable torque range of the variable transmission 14 is transmitted without a slip of the belt 36 on the pulleys 24, 34.

An ignition system 48 for the engine 10 is provided with an ignition timing sensor 50 for detecting an ignition signal which is applied to the ignition system 48 to produce a spark within cylinders of the engine 10 to ignite a fuel charge. The ignition timing sensor 50 functions as a detector to detect an actual running speed of the engine 10. The air-fuel mixture is distributed to the engine cylinders through an intake manifold in which is disposed a throttle valve 46 to control the amount of the air-fuel mixture that reaches the cylinders. A throttle position sensor 52 is provided adjacent to the throttle valve 46. This throttle position sensor 52 functions as a detector to detect an output of the engine 10 which is currently required (hereinafter referred to as "required output of the engine"). The ignition timing sensor 50 generates an IGNITION signal SI, for example, two pulses per revolution of the engine 10 in the case where the engine has four cylinders. The IGNITION signal SI is applied to an I/F circuit 54 which converts the IGNITION signal SI into a coded signal representing an interval "te" of the signal SI. This coded signal is fed to an I/O port 58. The throttle position sensor 52 generates a THROTTLE signal ST which is generally a voltage signal representing an angle of opening of the throttle valve 46. The THROTTLE signal ST is applied to an A/D converter 56 which converts the voltage THROTTLE signal ST into a digital signal, which is fed to the I/O port 58. Thus, the IO port 58 receives the input data representing the ignition interval of the engine 10, and the opening angle of the throttle valve 46, which indicate the actual running speed and required output of the engine 10, respectively.

On the other hand, the transmission 14 is provided with a speed sensor 60 which is adapted to detect a rotating speed of the first variable-diameter pulley 24. The speed sensor 60 generates a ROTATION signal SR which is a pulse signal representing a rotating speed of the first pulley 24 (input shaft 30). The ROTATION signal SR is applied to the I/F circuit 54 which converts the ROTATION signal SR into a coded signal representing an interval "ti" of the signal SR. This coded signal is fed to the I/O port 58. In other words, the ROTATION signal SR represents a rotating speed of the driven rotary member 26 of the electromagnetic clutch 12.

Figure 3:
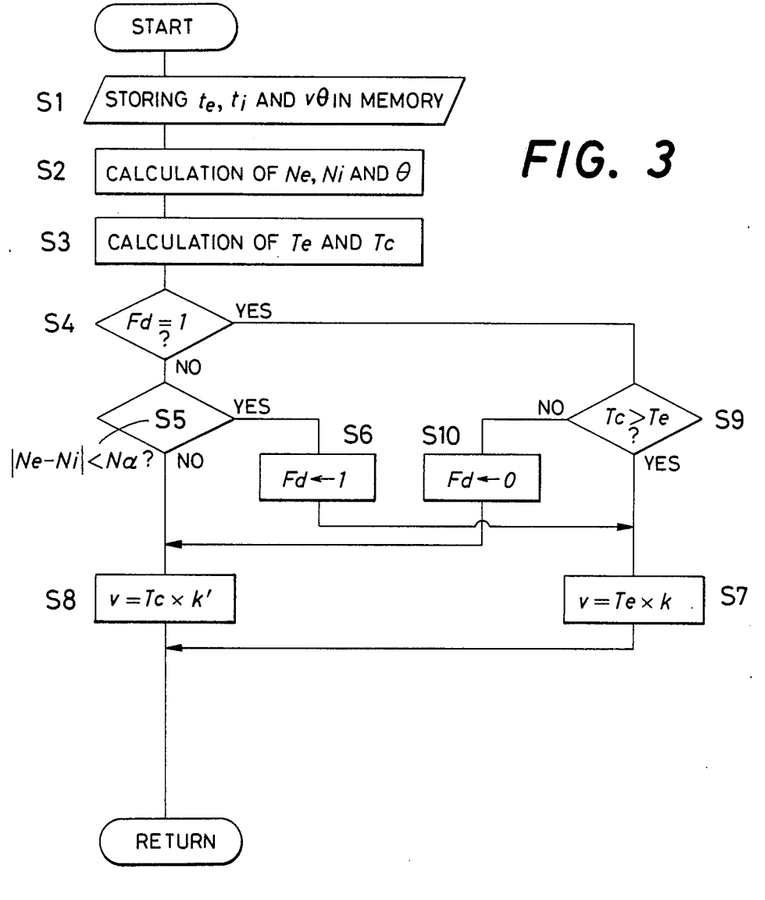
FIG. 3 is a flow chart illustrating the operation of the controlling apparatus of the invention of FIG. 1.
Figure 4:
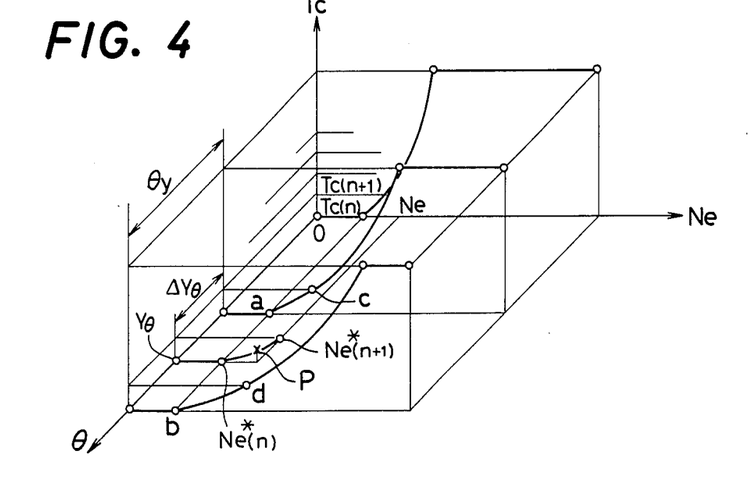
FIGS. 4 and 5 are graphical representations of data maps or tables stored in a read-only-memory 64 of the apparatus.
Figure 5:
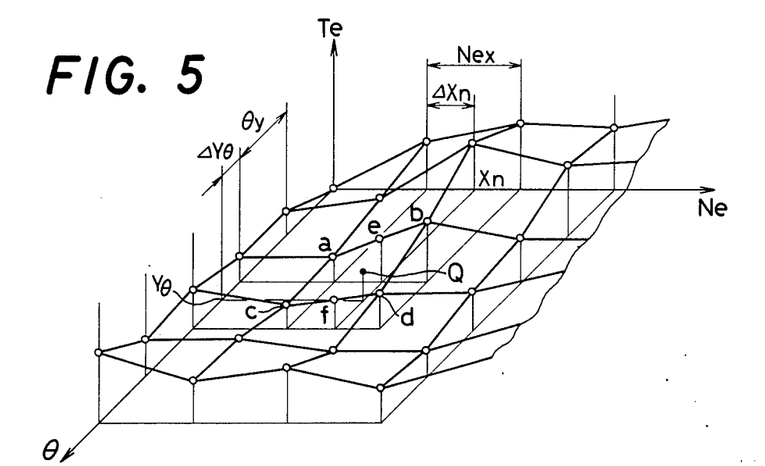
Figure 6:
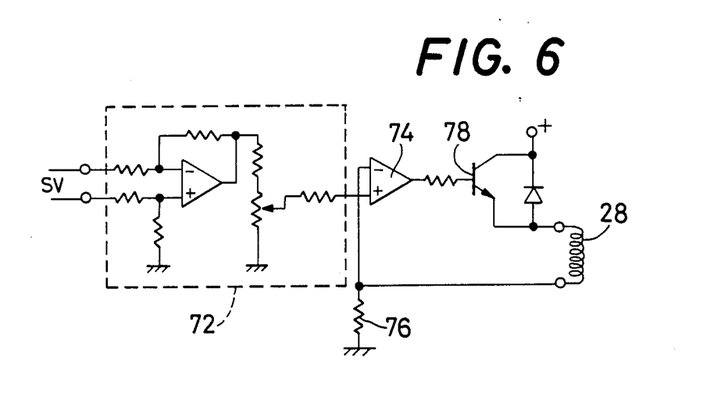
FIG. 6 is a diagram showing an electric circuit of a V/I converter of the controlling apparatus.
Figure 7:
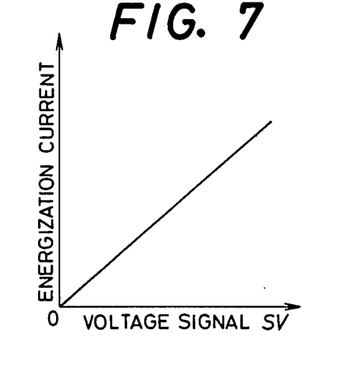
FIG. 7 is a graphical representation of a relation between the electric current applied to the clutch solenoid and a voltage signal indicative of the electric current.

To the I/O port 58 are connected, via a data bus line, a central processing unit 62 (hereinafter referred to as CPU 62), a read-only-memory 64 (hereinafter called ROM 64) and a random-access-memory 66 (hereinafter referred to as RAM 66), which are well known in the art. The ROM 64 stores information which includes a program represented in a flow chart of FIG. 3 which will be described, and data maps (data tables) which are indicated in FIGS. 4 and 5 and used for executing the above program of FIG. 3. The CPU 62 performs a data processing operation according to the program stored in the ROM 64, while utilizing a temporary data storage function of the RAM 66. During the data processing operation, the CPU 62 determines a magnitude of electric current to be applied to the solenoid 28 of the electromagnetic clutch 12, and applies to a D/A converter 68 a control signal SC which represents the determined magnitude of current that should be applied to the solenoid 28. The D/A converter 68 converts the received control signal SC into a corresponding voltage signal SV, which is then applied to a V/I converter (voltage-current converter) 70. The V/I converter 70 supplies to the solenoid 28 an electric energizing current which corresponds to the voltage signal SV fed from the D/A converter 68. Stated more specifically, the V/I converter 70 includes, as illustrated in FIG. 6, a signal-level converter circuit 72 which lowers the level of the voltage signal SV, a differential amplifier 74 whose positive input receives the lowered signal SV, and a resistor 76 which is connected to a negative input of the differential amplifier 74. The resistor 76 is connected in series with the solenoid 28, and a comparatively low terminal voltage of the resistor 76 is applied to the negative input of the differential amplifier 74. In other words, the negative input of the amplifier 74 receives a signal representative of an electric current which is currently energizing the solenoid 28. Thus, the resistor 76 serves as a current sensor for detecting a magnitude of electric current actually flowing through the solenoid 28. The differential amplifier 74 provides a transistor 78 with a base current, such that the difference in level between the signals received at the positive and negative inputs is equal to zero. The transistor 78 which is also a component of the V/I converter 70, is connected between a positive power source and the solenoid 28, and supplies the solenoid 28 with an electric current of a magnitude which varies corresponding to the output of the differential amplifier 74. Thus, the diferential amplifier 74 and transistor 76 serve as a current feedback regulator for varying an energization voltage of the solenoid 28 such that the magnitude of electric current to be applied to said solenoid coincides with the detected magnitude of electric current actually flowing through said solenoid, irrespective of a variation in impedance of the solenoid 28 due to change in temperature thereof.

The operation of the controlling apparatus constructed as discussed hitherto will be described with reference to the flow chart of FIG. 3.

At first, the CPU 62 executes an initializing routine in step S1 to zero the content of a flag Fd which will be described. Further, the CPU 62 operates in step S1, according to the signals SI, SR and ST from the I/O port 58, to store in the RAM 66 the interval "te" represented by the IGNITION signal SI, the interval "ti" represented by the ROTATION signal SR, and a voltage signal $v\theta$ corresponding to the opening angle $\theta$ of the throttle valve 46 represented by the THROTTLE signal ST. The step S1 is followed by step S2 wherein the running speed Ne of the engine 10, rotating speed Ni of the driven rotary member 26 of the electromagnetic clutch 14 (rotating speed of the input shaft 30), and the opening angle $\theta$ (%) of the throttle valve 46 are calculated based on the stored intervals "te" and "ti" and the voltage signal $v\theta$, and according to formulas (1), (2) and (3) indicated below.

$$Ne \text{ (r.p.m.)} = 60 \text{ sec.}/(2 \times te) \quad (1)$$

$$Ni \text{ (r.p.m.)} = 60 \text{ sec.}/ti \quad (2)$$

$$\theta(\%) = [(v\theta - v \text{ min.})/(v \text{ max.} - v \text{ min.})] \times 100 \quad (3)$$

where, v min.: voltage of the THROTTLE signal ST while the throttle valve 46 is fully closed (while the engine 10 is idling)

v max: voltage of the THROTTLE signal ST while the valve 46 is fully open (while the engine 10 is running at its top speed)

Thus, in this specific embodiment, the CPU 62 which executes the above step S2, cooperates with the ignition timing sensor 50, speed sensor 60 and throttle position sensor 52 to constitute engine speed detecting means for detecting the actual speed Ne of the engine 10, means for detecting the rotating speed Ni of the driven rotary member 26, and engine output detecting means for detecting the required output of the engine 10, respectively.

Then, the CPU 62 goes to step S3 wherein an actual torque Te of the engine 10 and a clutch torque Tc of the electromagnetic clutch 12 at an initial stage of its engaging action are calculated based on the already calculated actual speed Ne of the engine 10 and opening angle $\theta$ of the throttle valve 46, and according to predetermined relations represented by the respective data maps stored in the ROM 64. Described in more detail, the ROM 64 stores data representing three curves in a three-axis coordinate system wherein the clutch torque Tc, opening angle $\theta$ of the throttle valve 46 and actual speed Ne of the engine are taken as variables along respective Tc, $\theta$ and Ne axes, as illustrated in FIG. 4. The three curves are located in parallel Tc—Ne planes at different positions along the $\theta$ axis. That is, the three curves represent rates of increase in the clutch torque Tc relative to the actual speed Ne of the engine 10. The clutch torque Tc corresponding to a given opening angle $\theta$ of the throttle valve 46 is calculated from the stored data representing the three curves, by means of linear interpolation. The three curves represented by the stored data are equally spaced from each other along the $\theta$ axis with a spacing of $\theta y$. The stored Tc coordinate positions Tc(n) of each of these curves are equally spaced along the Tc axis. For example, coordinates of points "a" and "c", and coordinates of points "b" and "d" are stored in the ROM 64 to represent parts of the second and third curves, as shown in FIG. 4. The coordinates of points "a" and "b" are located in the Tc(n) plane, and the coordinates of points "c" and "d" are located in the Tc(n+1) plane, where "n" is an integer beginning with zero. When the opening angle $\theta(\%)$ of the throttle valve 46 has been detected, a coordinate $Y\theta$ on the $\theta$ axis is first calculated by dividing the detected opening angle $\theta(\%)$ by $\theta y$ (unit distance of the $\theta$ axis). Then, an Ne coordinate corresponding to the $\theta$ coordinate $Y\theta$, i.e., an engine speed Ne*(n) is obtained based on the stored Ne coordinate of point "a" and Ne coordinate of point "b" which are nearest to the $\theta$ axis ($Y\theta$ coordinate), by means of linear interpolation between the Ne coordinates of points "a" and "b", according to formula (4a) indicated below. As soon as the engine speed Ne*(n) has been calculated, the value Ne*(n) is compared with an actual speed Ne of the engine 10. If the actual engine speed Ne is higher than the calculated value Ne*(n), an Ne coordinate in the Tc(n+1) plane, i.e., an engine speed Ne*(n+1) is calculated based on the stored Ne coodinates of points "c" and "d", in the same manner as used for obtaining the coordinates Ne*(n), according to formula (4b) also indicated below. If the actual speed Ne of the engine 10 is lower than the calculated value Ne*(n+1), that is, if the inequality Ne*(n)<Ne<Ne*(n+1) is satisfied, a current clutch torque Tc is calculated based on the actual engine speed Ne, and on the clutch torque values Tc(n) and Tc(n+1) corresponding to the already obtained coordinate values Ne*(n) and Ne*(n+1). In other words, coordinates of point "P" are calculated by linear interpolation according to the following formula (4) wherein the formulas (4a) and (4b) referred to above are used:

$$Tc = \frac{Tc(n+1) - Tc(n)}{Ne^*(n+1) - Ne^*(n)} \times [Ne - Ne^*(n)] + Tc(n) \quad (4)$$

where, $$Ne^*(n) = (b-a) \times \Delta Y\theta + a \quad (4a)$$

$$Ne^*(n+1) = (d-c) \times \Delta Y\theta + c \quad (4b)$$

Similarly, a data map representing an experimentally obtained relation among the opening angle $\theta$, actual engine speed Ne and engine output torque Te is stored in the ROM 64, in the form of coordinate values in a three-axis coordinate system wherein the variables $\theta$, Ne and Te are taken along respective axes, as shown in FIG. 5. Based on the stored data which includes, for example, coordinates of points "a" through "d", coordinates of point Q are calculated to find an actual output torque Te of the engine 10 corresponding to the actual throttle opening angle $\theta$ and engine speed Ne. In more detail, coordinates $Y\theta$ and Xn on the $\theta$ and Ne axes are first obtained by dividing the actual opening angle $\theta$ (%) and the actual engine speed Ne by values $\theta y$ and Nex, respectively. The values $\theta y$ and Nex are unit distances taken along the $\theta$ and Ne axes, respectively. Then, coordinates of points "e" and "f" are obtained based on the obtained values $\theta Y$ and Xn and on stored coordinate values "a" through "d", by linear interpolation according to formulas (5a) and (5b) indicated below. Subsequently, the output torque Te is calculated by linear interpolation between the coordinates of points "e" and "f", according to the formula (5) wherein the formulas (5a) and (5b) are used:

$$Te = (f-e) \times \Delta Y\theta + e \quad (5)$$

where, $$e = (b-a) \times \Delta Xn + a \quad (5a)$$

$$f = (d-c) \times \Delta Xn + c \quad (5b)$$

Referring back to FIG. 3, the CPU 62 then goes to step S4 to check if the content of the flag Fd is "1" (one) or not, i.e., to check whether the instant apparatus should proceed either to control an engaging action of the electromagnetic clutch 12, or to control the clutch 12 for a suitable maximum transmission torque thereof after the completion of the engaging action. If the checking in Step S4 reveals that the flag Fd is set at "0" (zero), the CPU 62 goes to step S5 to check if the clutch 12 is still in the process of engagement or has completed the engaging action. More specifically, the CPU 62 check to see whether the absolute value of a difference between a rotating speed of the driving rotary member 22 (corresponding to the engine speed Ne) and a rotating speed Ni of the driven rotary member 26 (first pulley 14) is smaller than a predetermined stored value N$\alpha$ which is as small as to fall within a range of a computing error of the CPU 62. In the case where the absolute value of that difference is found to be smaller than the stored value N$\alpha$, the CPU 62 judges that the clutch 12 has completed its engaging action, and goes to step S6 in order to set the flag Fd to "1". Step S6 is followed by step S7 which will be described in more detail.

In the case where the checking in step S5 reveals that the absolute difference between the speeds of the two rotary members 22, 26 is larger than the stored value N$\alpha$, the CPU 62 judges that the electromagnetic clutch 12 is in the process of an engaging action or has not initiated the engaging action. Accordingly, the CPU 62 goes to the next step S8 wherein an engaging action of the clutch, for example upon starting of the vehicle, is controlled in the following manner. At first, a control amount "v" (control voltage) is calculated by multiplying the clutch torque Tc (already obtained in step S3) by a predetermined constant k'. Then, the previously indicated control signal SC representing the control amount "v" is fed from the I/O port 58 to the D/A converter 68. The control signal SC is converted into the corresponding voltage signal SV which is applied to the V/I converter 70. As a result, the V/I converter 70 supplies the solenoid 28 with an electric current so that a torque transmitted by the clutch 12 is equal to the determined clutch torque Tc. The constant k' is selected so that the output of the voltage signal SC eventually enables the clutch 12 to provide the calculated clutch torque Tc.

The above described control cycle is executed repeatedly at a high rate, i.e., continuously, whereby the instantaneous clutch Torque Tc during an engaging action of the clutch 12 is calculated repeatedly in response to the actual speed Ne of the engine 10 or the actual opening angle $\theta$ of the throttle valve 46, and the control signal SC representing the control amount "v" is determined based on the currently calculated clutch torque Tc. Thus, the degree of engagement of the clutch 12 is controlled according to the currently required output of the engine 10 which is represented by the throttle opening angle $\theta$. Consequently, the engaging action of the clutch 12 takes place so as to assure a considerable improvement in fuel economy as well as relatively high drivability (stable acceleration) of the vehicle. Stated more specifically, when the required output of the engine 10 is high, i.e., when the opening angle $\theta$ of the throttle valve 46 is large, the rate of increase in the solenoid energizing electric current relative to the actual engine speed Ne is held relatively low. In other words, while the required output of the engine 10 is high, the electric current to be applied to the solenoid 28 is increased with the engine speed Ne, at a relatively low rate as indicated by a curve A in FIG. 8. Hence, the driving and driven rotary members 22, 26 undergo a relatively large degree of slip during engagement thereof. This slip of the clutch 12 permits a relatively high speed of the engine 10, and thus enables the vehicle to be accelerated with enough power (i.e., with high drivability) even in the event the vehicle is abruptly accelerated, or started on an upward slope.

Figure 8:
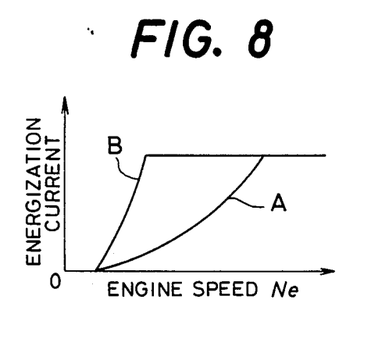
FIGS. 8 and 9 are graphical views useful for understanding the controlling operation of the apparatus of the invention of FIG. 1.

On the contrary, while the currently required output of the engine 10 is relatively low with a relatively small opening angle $\theta$ of the throttle valve 46, the rate of increase of the solenoid energizing current to the engine speed Ne is made relatively large, whereby the engaging action of the clutch 12 is carried out at a high rate, as indicated by a curve B in FIG. 8. It is noted that a fast engaging action of the clutch 12 while the required engine output is low will not result in the loss of drivability of the vehicle, because a speed difference between the two rotary members 22, 26 is small in such low output condition. Simultaneously, the fast engaging action of the clutch 12 minimizes a power loss due to slippage of the two rotary members 22, 26, thereby improving the fuel economy of the engine 10.

As is apparent from the foregoing description of the instant embodiment, the step S3 wherein the clutch torque Tc is calculated based on the opening angle $\theta$ of the throttle valve 46, corresponds to means which serves to change a rate of increase in the solenoid energizing electric current relative to the actual engine speed Ne, such that the rate of increase is increased as the required output of the engine 10 is decreased. Further, the step S8 is considered to correspond to current adjusting means which serves to increase a magnitude of the electric current according to the changing rate of increase, as the actual speed Ne of the engine 10 is increased.

In the event the checking in the previously discussed step S4 reveals that the flag Fd is set at "1", the CPU 62 goes via step S9 to step S7 for controlling the maximum transmission torque of the clutch 12 (solenoid energizing electric current) after completion of its engaging action. In step S9, the clutch torque Tc is compared with the output torque Te of the engine 10. If the clutch torque Tc is not greater than the engine torque Te, which means a slip of the clutch 12, the step S9 is followed by step S10 to set the flag Fd to "0". Then, the CPU 62 goes to the previously stated step S8. If the clutch torque Tc is greater than the engine torque Te, that is, if no slip occurs in the clutch 12, the CPU 62 goes to the step S7 wherein the actual engine torque Te is multiplied by a constant k to work out the control amount "v". Then, the control signal SC corresponding to the control amount "v" is generated from the I/O port 58 and fed to the D/A converter 68. In response to the control signal SC, the D/A converter 68 applies the corresponding SV signal to the V/I converter 70, which applies the electric current to the solenoid 28, so that the torque transmitted by the clutch 12 is equal to the engine torque Te multiplied by the constant k. This constant k is selected so that the maximum transmission torque of the clutch 12 is larger than the actual torque Te of the engine 10 but sufficiently smaller than an allowable upper limit torque of the transmission 14 at its output shaft.

Hence, the electric current to be applied to the solenoid 28 of the clutch 12 is controlled such that the clutch torque is held slightly larger than the actual output torque Te of the engine 10. With this arrangement, a slip occurs in the electromagnetic clutch 12 rather than in the variable transmission 14 in the event of an extraordinary increase of the engine torque at its output shaft beyond the allowable upper limit. Accordingly, the variable transmission 14 is protected against otherwise possible slip of the belt 36 on the pulleys 24, 34. According to a conventional arrangement for controlling an electromagnetic clutch (12) in which the solenoid is energized by relatively high constant current in order to make tight engagement thereof, a comparatively high hydraulic pressure should be applied to the actuators to operate driving and driven rotary members (22, 26) in order to prevent the slip of a transmission belt (36) on the pulleys (22, 26). In such arrangement, the power transmission system of the vehicle undergoes a considerable loss of power at the variable transmission (14). According to the instant embodiment of the controlling apparatus, however, the variable transmission 14 can be operated without a slip of the belt 36 with a relatively low hydraulic pressure applied to the actuators, since the maximum transmission torque to be transmitted by the engaged clutch 12 is controlled so as to be only slightly greater than the engine torque Te. Consequently, the power loss of the power transmission system of the vehicle is minimized and the fuel economy is improved.

Figure 9:
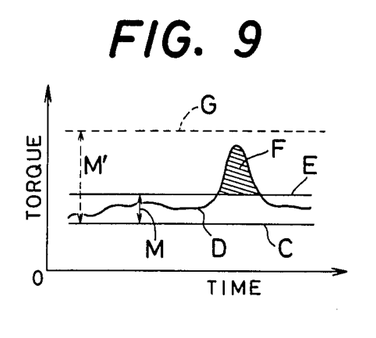

Described in more detail referring to FIG. 9 wherein the stored engine output torque Te is indicated by a line C while the actual engine output torque is shown by a curve D, the maximum torque to be transmitted by the clutch 12 after completion of its engagement, which torque is indicated by a line E, is controlled in step S7 so as to be slightly greater than the torque level C. The hydraulic pressure to operate the transmission 14 is determined to be relatively low so that the torque of the input shaft 30 can be transmitted to the output shaft 32 without a slip. Conventionally, the hydraulic pressure to operate the transmission (14) is set comparatively high to prevent a slip of the pulleys (24, 34) even in the event of an extraordinary increase of the actual engine torque as indicated at F. A broken line G in FIG. 9 shows an allowable upper limit of the torque which can be transmitted by the transmission (14) without a slip. This upper limit level G corresponds to the hydraulic pressure level applied to the transmission (14), and a difference between the levels C and G means a margin M'. Compared with this margin M' in the known arrangement, the corresponding margin M between the levels C and E in the present invention is greatly reduced. Accordingly, the instant controlling apparatus suffers a minimum power loss due to the need of such a margin.

As is apparent from the foregoing description, the previously discussed step 3 corresponds to engine torque determining means which serves to calculate the actual output torque Te of the engine 10 based on the detected actual speed Ne and required output (opening angle $\theta$ of the throttle valve 46) of the engine 10, and according to the stored relation of FIG. 5 among those three variables. Further, the step S7 corresponds to means which controls the magnitude of the solenoid energizing electric current based on the determined actual output torque Te of the engine 10, such that the torque transmitted by the clutch 12 is slightly larger than the actual output torque of the engine 10 but smaller than the allowable upper limit torque G of the transmission 14.

According to the experiments conducted by the present applicant, the specific fuel consumption of the vehicle in the LA4 mode is reduced by 5% (approx. 4 miles/gallon) thanks to the control in step S8 of the engaging action of the clutch 12, and by 2–3% thanks to the control in step S7 of the clutch 12 after the engagement.

While the preferred embodiment of the controlling method and apparatus of the invention has been described hitherto with reference to the accompanying drawing, the invention may be otherwise embodied.

For example, while the engine torque Te and clutch torque Tc are calculated in step S3 by means of linear interpolation based on the stored data map, the calculation may be carried out by means of circular interpolation. Further, the stored data map may be replaced by a stored functional equation including the throttle opening angle $\theta$ and the engine speed Ne as variables. In this instance, the torque values Te and Tc are calculated by solving the functional equation.

Although the currently required output of the engine 10 is determined based on the opening angle $\theta$ of the throttle valve 46, the required output may be obtained based on other quantities which represents an operating level of a mechanism which controls the engine torque such as: an amount of depression of an accelerator pedal; a vacuum pressure in an intake manifold connected to the engine 10; a rate of increase in the engine speed; and an amount of injection of fuel (where the engine 10 is a diesel engine or of a fuel injection type).

While the clutch torque Tc and engine torque Te are multiplied by the constants k' and k in steps S7 and S8, it is possible that the data to be stored in the ROM 64 be multiplied by such constants. Further, in step S7, the control amount "v" may be obtained by adding a constant $\Delta T$ to the engine torque Te, or to the engine torque Te multiplied by the constant k.

While the actual engine torque Te is obtained in step S3 by calculation, it is possible to provide the output shaft of the engine 10 with a torque sensor and detect the actual output torque Te based on an output signal from such torque sensor.

For determining a rate of increase of the clutch torque Tc relative to the actual engine speed Ne, the data map of FIG. 4 may be replaced by stored plural relations $[Tc=f(Ne)]$ representative of different Tc—Ne curves which are selected so that the curve defining a higher rate of increase of the torque Tc is used as the throttle opening angle $\theta$ is decreased.

As a further modification, the control amount "v" may be calculated by solving the following formula (6):

$$v = Ko(Ne - Nidl) \quad (6)$$

where,
Ko: constant
Nidl: idling engine speed

In this instance, the constant ko is decreased continuously or in steps as the throttle opening angle $\theta$ is decreased.

As a still further modification, the electromagnetic clutch 12 which is directly coupled to the engine 10 and the transmission 14 in the illustrated environment, may be disposed in indirect connection with the engine 10 and the transmission 14. Further, the continuously variable transmission may be replaced by other types of transmissions.

As another modification, it is possible to use a torque sensor to determine the actual torque of the engine 10.

It will be obvious that other changes and modifications may be made in the invention without departing from the spirit and scope of the invention defined in the appended claims.

What is claimed is:

1. A method of controlling an electromagnetic clutch of the magnetic powder type which is incorporated in a power transmission system of a vehicle to transmit an output of an engine to drive wheels, and which includes a driving rotary member operatively connected to said engine, a driven rotary member operatively connected to said drive wheels and cooperating with said driving rotary member to define an annular space therebetween, a mass of magnetic powder accommodated in said annular space, and a solenoid to be energized for bonding together particles of said magnetic powder such that said mass of magnetic powder transmits a torque of the engine to the drive wheels, a clutch torque to be transmitted from said driving rotary member to said driven rotary member being varied as a function of an electric current to energize the solenoid, so that the clutch torque is increased with an actual speed of the engine during the engaging action of the clutch, said method comprising the steps of:

detecting a currently required output of said engine during a period of said engaging action of said elecromagnetic clutch; and changing a rate of increase in said electric current relative to said actual speed of the engine, such that said rate of increase is increased as said required output of the engine is decreased.

2. An apparatus for controlling an electromagnetic clutch of the magnetic powder type which is incorporated in a power transmission system of a vehicle to transmit an output of an engine to drive wheels, and which includes a driving rotary member operatively connected to said engine, a driven rotary member operatively connected to said drive wheels and cooperating with said driving rotary member to define an annular space therebetween, a mass of magnetic powder accommodated in said annular space, and a solenoid to be energized for bonding together particles of said magnetic powder such that said mass of magnetic powder transmits a torque of the engine to the drive wheels, a cluch torque to be transmitted from said driving rotary member to said driven rotary member being varied as a function of an electric current to energize the solenoid, so that the clutch torque is increased with an actual speed of the engine during the engaging action of the clutch, said apparatus comprising:

engine output detecting means for detecting a currently required output of said engine during a period of said engaging action of said electromagnetic clutch;

increase-rate changing means for changing a rate of increase in said electric current relative to said actual speed of the engine, such that said rate of increase is increased as said required output of the engine is decreased; and current adjusting means for increasing a magnitude of said electric current according to said rate of increase thereof, as said actual speed of the engine is increased.

3. An apparatus as claimed in claim 2, wherein said engine output detecting means comprises a sensor for detecting an angle of opening of a throttle valve disposed in an intake manifold connected to said engine.

4. An apparatus as claimed in claim 2, wherein said increase-rate changing means continuously calculates said clutch torque based on said required output of the engine and on said actual speed of the engine, and according to a predetermined relation among said clutch torque, said required output and said actual speed, and said current adjusting means supplies said electric current to said solenoid while the calculated clutch torque is smaller than the engine torque, in order to obtain said calculated clutch torque.

5. An apparatus as claimed in claim 2, wherein said current adjusting means comprises a current sensor for detecting a magnitude of electric current actually flowing through said solenoid, and a current feedback regulator for varying an energization voltage of said solenoid such that the magnitude of electric current to be applied to said solenoid coincides with the detected magnitude of electric current actually flowing through said solenoid, irrespective of a variation in impedance of said solenoid.

6. An apparatus for controlling an electromagnetic clutch of magnetic powder type which is incorporated in a power transmission system of a vehicle which includes an engine, and a continuously variable transmission of belt-and-pulley type operatively connected to drive wheels of the vehicle and comprising a pair of variable-diameter pulleys each having a variable-width Vee groove, and a transmission belt engaging the Vee grooves of the variable-diameter pulleys, said transmission transmitting an output of the engine to the drive wheels without a slip of the belt on the pulleys within an allowable torque range, said electromagnetic clutch being interposed between the engine and the transmission and including a solenoid to be energized for an engaging action of the clutch to transmit a torque of the engine to the transmission according to a variation in magnitude of an electric current to energize the solenoid, said apparatus controlling said magnitude of electric current, even after the completion of said engaging action of the clutch, so as to control a clutch torque to be transmitted by the clutch to the variable transmission, wherein the improvement comprises:

engine speed detecting means for detecting an actual speed of the engine;

engine output detecting means for detecting a currently required output of the engine;

engine torque determining means for determining an actual output torque of the engine; and current adjusting means for controlling said magnitude of electric current based on said determined actual output torque of the engine, such that said clutch torque transmitted by the clutch to the transmission is larger than said actual output torque of the engine and smaller than an allowable upper limit torque of said transmission at its output shaft.

7. An apparatus as claimed in claim 6, wherein said engine speed detecting means comprises a sensor disposed on an ignition system for said engine and detecting an ignition signal applied to said ignition system, for detecting said actual speed of the engine.

8. An apparatus as claimed in claim 6, wherein said engine output detecting means comprises a sensor for detecting an angle of opening of a throttle valve disposed in an intake manifold connected to said engine.

9. An apparatus as claimed in claim 6, wherein said current adjusting means comprises a current sensor for detecting a magnitude of electric current actually flowing through said solenoid, and a current feedback regulator for varying an energization voltage of said solenoid such that the magnitude of electric current to be applied to said solenoid coincides with the detected magnitude of electric current actually flowing through said solenoid, irrespective of a variation in impedance of said solenoid.

10. An apparatus as claimed in claim 6, wherein said engine torque determining means determines said actual output range of the engine based on the detected actual speed and required output of the engine, and according to a predetermined relation among said actual output torque, actual speed and required output of the engine.

* * * * *